United States Patent
Liao et al.

(10) Patent No.: US 9,521,518 B1
(45) Date of Patent: Dec. 13, 2016

(54) METHOD, SYSTEM, AND COMPUTER-READABLE RECORDING MEDIUM FOR OBJECT LOCATION TRACKING

(71) Applicant: Wistron Corporation, New Taipei (TW)

(72) Inventors: Hsin-Hui Liao, New Taipei (TW); Wen-Chin Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/077,915

(22) Filed: Mar. 23, 2016

(30) Foreign Application Priority Data

Aug. 21, 2015 (TW) .............................. 104127255 A

(51) Int. Cl.
| H04W 24/00 | (2009.01) |
| H04W 4/02 | (2009.01) |
| H04W 4/04 | (2009.01) |
| H04W 76/02 | (2009.01) |
| G06K 19/077 | (2006.01) |
| G06K 7/10 | (2006.01) |

(52) U.S. Cl.
CPC .......... *H04W 4/021* (2013.01); *G06K 7/10316* (2013.01); *G06K 19/07758* (2013.01); *H04W 4/04* (2013.01); *H04W 76/023* (2013.01)

(58) Field of Classification Search
CPC ... H04W 4/021; H04W 4/04; G06K 19/07758; G06K 7/10316
USPC ............ 455/404.2, 418–422.1, 412.1–414.2, 455/41.1–41.2, 456.2, 456.1, 457, 552.1; 340/572.4, 572.6, 572.7, 572.8, 572.1, 340/10.31, 10.34, 10.2

See application file for complete search history.

(56) References Cited

U.S. PATENT DOCUMENTS

| 6,335,686 B1 * | 1/2002 | Goff | .................. G06K 7/10079 340/572.4 |
| 6,392,544 B1 * | 5/2002 | Collins | ................ G06K 7/0008 340/10.1 |

(Continued)

FOREIGN PATENT DOCUMENTS

| CN | 102192738 | 6/2005 |
| CN | 203206239 | 9/2013 |

(Continued)

OTHER PUBLICATIONS

"Office Action of Taiwan Counterpart Application" with partial English translation, issued on May 9, 2016, p. 1-p. 13.

*Primary Examiner* — Babar Sarwar
(74) *Attorney, Agent, or Firm* — Jianq Chyun IP Office

(57) ABSTRACT

A method, a system, and a computer-readable recording medium for object location tracking are provided. The system includes a server, at least one case, multiple objects, and a mobile electronic device. The method is adapted to the mobile electronic device and includes the following steps: transmitting a lookup request for a target object to the server; when obtaining location information of the target object from the server, transmitting a search request to the server, where the target object is located in a target case; in response to a distance between the mobile electronic device and a target case detected by a distance sensor of the target case, displaying a prompt signal corresponding to a first prompt signal signaled by a case prompt device of the target case; and in response to the distance determined by the server to be less than a distance threshold, displaying a prompt object.

19 Claims, 7 Drawing Sheets

(56) References Cited

U.S. PATENT DOCUMENTS

| | | | | |
|---|---|---|---|---|
| 6,812,838 B1* | 11/2004 | Maloney | G06K 7/10079 | 340/568.1 |
| 6,933,849 B2* | 8/2005 | Sawyer | G01S 7/003 | 340/572.4 |
| 6,943,688 B2* | 9/2005 | Chung | H04L 63/12 | 340/551 |
| 6,956,538 B2* | 10/2005 | Moore | G06K 7/10336 | 340/572.4 |
| 7,116,230 B2* | 10/2006 | Klowak | G01S 13/825 | 340/5.92 |
| 7,271,715 B2* | 9/2007 | Aupperle | G08B 13/1427 | 340/539.1 |
| 7,589,616 B2* | 9/2009 | Klatsmanyi | G08B 13/2462 | 340/10.1 |
| 7,605,700 B2* | 10/2009 | Drago | G06K 19/0723 | 340/10.1 |
| 7,648,065 B2* | 1/2010 | Marino | G06Q 10/08 | 235/383 |
| 7,668,754 B1* | 2/2010 | Bridgelall | G06Q 30/06 | 705/26.9 |
| 7,672,872 B2* | 3/2010 | Shanton | A47F 5/11 | 340/5.92 |
| 7,796,949 B2* | 9/2010 | Matsushita | H04B 1/406 | 455/114.2 |
| 8,068,022 B2* | 11/2011 | Ben-Itzhak | G08B 13/1427 | 340/524 |
| 8,174,392 B1* | 5/2012 | Saghbini | G06F 19/3462 | 235/385 |
| 8,260,199 B2* | 9/2012 | Kowalski | G06K 7/10178 | 235/462.25 |
| 8,275,665 B2* | 9/2012 | Bodin | G06Q 10/087 | 235/440 |
| 8,289,163 B2* | 10/2012 | Erickson | G06K 7/0008 | 340/572.1 |
| 8,718,669 B2* | 5/2014 | Lewis | G06K 7/0008 | 340/10.1 |
| 8,770,479 B1* | 7/2014 | Shoenfeld | G06Q 90/00 | 235/375 |
| 8,903,378 B2* | 12/2014 | Shah | G08B 21/24 | 455/41.1 |
| 2004/0100413 A1* | 5/2004 | Waldner | G06K 7/10336 | 343/742 |
| 2006/0009240 A1* | 1/2006 | Katz | G01S 5/0289 | 455/457 |
| 2007/0241907 A1* | 10/2007 | Bauchot | G06K 19/07749 | 340/572.7 |
| 2008/0198019 A1* | 8/2008 | Rodgers | H01Q 1/2216 | 340/572.7 |
| 2008/0266092 A1* | 10/2008 | Campero | G01S 13/82 | 340/572.1 |
| 2009/0251319 A1* | 10/2009 | Ichikawa | B65G 1/1371 | 340/572.1 |
| 2010/0141450 A1* | 6/2010 | Nagai | G01S 11/06 | 340/572.1 |
| 2010/0194538 A1* | 8/2010 | dos Reis Medeiros | G06K 7/0008 | 340/10.1 |
| 2012/0133553 A1* | 5/2012 | Schmidt-Karaca | G01S 19/42 | 342/357.25 |
| 2012/0224076 A1* | 9/2012 | Niedermeyer | G06K 7/01 | 348/211.2 |
| 2013/0107042 A1* | 5/2013 | Forster | G06K 19/07713 | 348/143 |
| 2013/0181867 A1* | 7/2013 | Sturdivant | H04W 64/00 | 342/368 |
| 2014/0092241 A1* | 4/2014 | Brinkman | G06K 9/00671 | 348/135 |

FOREIGN PATENT DOCUMENTS

| | | |
|---|---|---|
| CN | 204576687 | 8/2015 |
| TW | 201243743 | 11/2012 |
| TW | M504296 | 7/2015 |

* cited by examiner

METHOD, SYSTEM, AND COMPUTER-READABLE RECORDING MEDIUM FOR OBJECT LOCATION TRACKING

CROSS-REFERENCE TO RELATED APPLICATION

This application claims the priority benefit of Taiwan application serial no. 104127255, filed on Aug. 21, 2015. The entirety of the above-mentioned patent application is hereby incorporated by reference herein and made a part of this specification.

TECHNICAL FIELD

The disclosure relates to an object location tracking technique.

BACKGROUND

When a user wishes to search for a particular book in a library, he/she may first enter its information such as a book title, an author, or an International Standard Book Number (ISBN) in a library lookup system to inquire about its current position and borrowing status. Next, the user may write down a call number of the book, compare the call number with signs and side labels of bookcases in the library, and search for the book on bookshelves based on a sort order.

However, when a library collection is large and some books are incorrectly placed, the user may waste time on looking for a particular book. Moreover, the librarians may feel time-consuming and tedious while performing conventional library routines such as book inventory management and book returning.

SUMMARY

Accordingly, the disclosure is directed to a method, a system, and a computer-readable recording medium for object location tracking, where a huge amount of objects within a space are able to be located and tracked rapidly so as to attain effective management.

An object location tracking system including multiple objects, at least one case, a mobile electronic device, and a server is provided. Each of the objects includes an electronic identification tag. Each of the at least one case is configured to place the objects and includes a tag reader having an antenna, a distance sensor, and a case prompt device. The server is configured to record object information and position information of each of the objects and establish connection with each of the at least one case and the mobile electronic device, where the position information of each of the objects includes the case where the object is located. When the server receives a lookup request for a target object from the mobile electronic device, the server determines whether the target object is located at any of the at least one case. When the server determines that the target object is located at a target case among the at least one case, the mobile electronic device obtains the position information of the target object from the server. When the server receives a search request for the target object from the mobile electronic device, the distance sensor of the target case detects a distance between the mobile electronic device, and the target case and transmits a distance detection message associated with the distance to the server. The mobile electronic device displays a first correspondence prompt signal corresponding to a first prompt signal emitted by the case prompt device of the target case. When the server determines that the distance is less than a distance threshold, the mobile electronic device displays a prompt object.

An object location tracking method, adapted for a mobile electronic device to search for a target object from at least one case having multiple objects, is also provided. Each of the objects includes an electronic identification tag. Each of the at least one cases includes a tag reader having an antenna, a distance sensor, and a case prompt device. The server establishes connection with each of the at least one case and the mobile electronic device and records objection information and position information of each of the objects. The method includes the following steps: transmitting a lookup request for a target object to the server; when obtaining location information of the target object from the server, transmitting a search request to the server, where the target object is located in a target case; in response to a distance between the mobile electronic device and the target case detected by a distance sensor of the target case, displaying a first correspondence prompt signal corresponding to a first prompt signal emitted by the case prompt device of the target case; and in response to the distance being determined by the server to be less than a distance threshold, displaying a prompt object.

A non-transitory computer-readable recording medium is also provided and stores computer program for executing the object location tracking method.

In view of the foregoing, in the proposed method, system, and computer-readable recording medium, the server is able to track all objects in a system at any time through an electronic identification tags configured on each of the objects and a tag reader configured on each case. While the mobile electronic device is searching for a particular object, the mobile electronic device not only provides a distance between the particular object and itself in real time for the user, but also synchronizedly displays a signal corresponding to a position at which the particular is located so as to allow the user to rapidly locate the particular object. The disclosure may reduce search time on the objects and further precisely obtain statuses of the objects to attain effective management.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
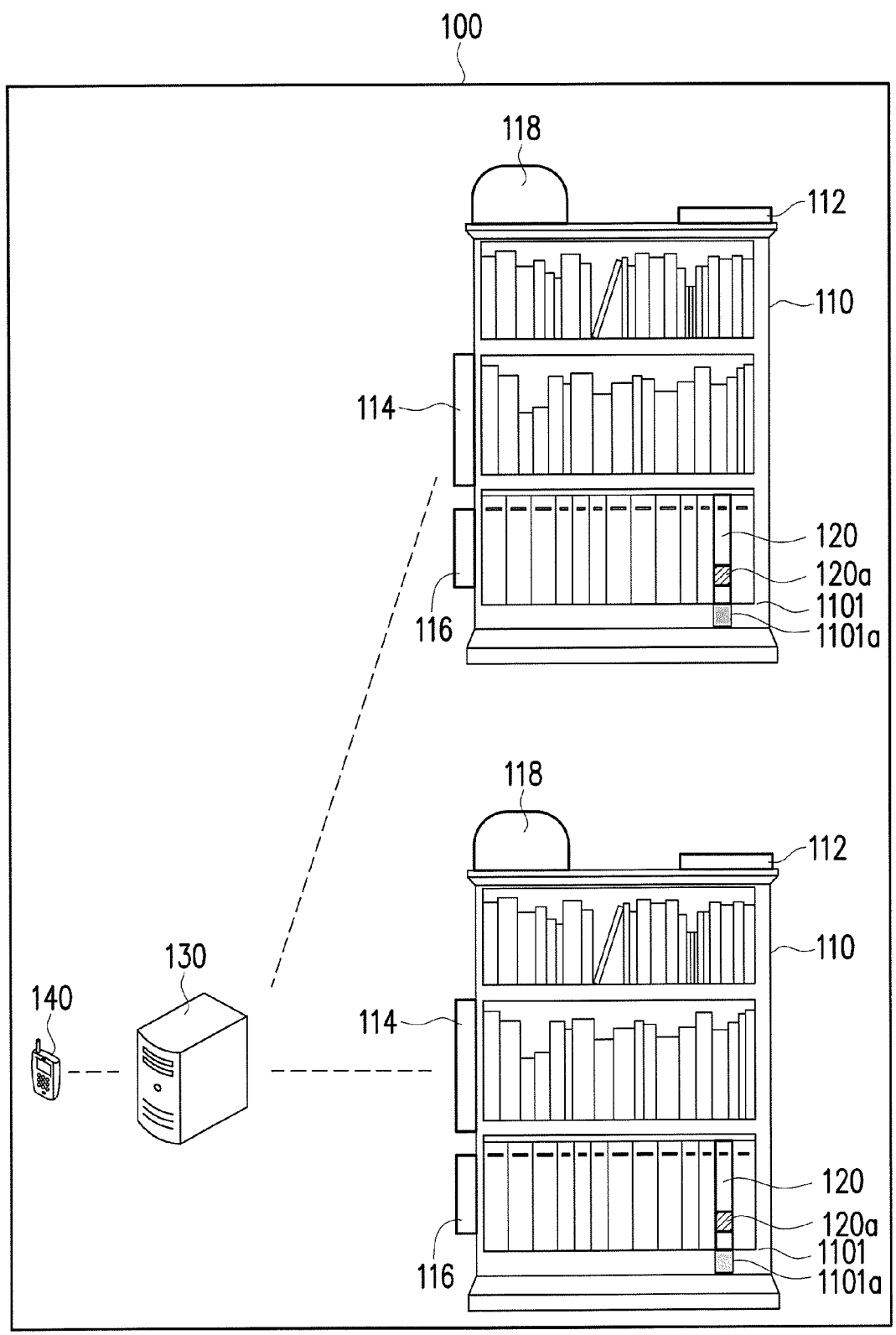
FIG. 1 illustrates a block diagram of an object location tracking system according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the disclosure.

FIG. 1 illustrates a block diagram of an object location tracking system according to an embodiment of the disclosure. It should, however, be noted that this is merely an illustrative example and the disclosure is not limited in this regard. All components of the system and their configurations are first introduced in FIG. 1. The detailed functionalities of the components are disclosed along with FIG. 2.

Referring to FIG. 1, an object location tracking system 100 includes multiple cases 110, multiple objects 120 placed in the cases 110, a server 130, and a mobile electronic device 140.

Each of the cases 110 may be a display case such as a bookcase in a library, a product rack in a market, a CD display rack in a music store, a storage rack in a warehouse, and so forth. Each of the cases 110 includes a tag reader 112, a distance sensor 114, a network module 116, and a case prompt device 118. Each of the objects 120 includes an electronic identification tag 120a configured to record object information. In an embodiment, each of the cases 110 further includes multiple shelves 1101, and each of the shelves 1101 includes a shelf prompt device 1101a. However, in some embodiments, each of the cases 110 does not include more than one shelf, and/or each of the cases 110 does not include any shelf prompt device. The disclosure is not limited herein.

The tag reader 112 is a reading device capable of reading information recorded in the electronic identification tag 120a through near field communication. In the present embodiment, the electronic identification tag 120a is a radio frequency identification (RFID) tag, and the tag reader 112 is a RFID reader which may obtain the information recorded in the electronic identification reader 120a from a wireless signal received via its antenna. The distance sensor 114 may be a sensor capable of detecting a distance between the mobile electronic device 140 and itself by using an indoor positioning technology such as Wi-Fi, ZigBee, or Bluetooth Low Energy (BLE). The network module 116 may be connected to the server 130 through wireless network connection such as WiMAX, Wi-Fi, 2G, 3G, 4G, and so forth. The case prompt device 118 may be a display capable of displaying texts or an emitting light.

It should understand by a person skilled in the art that each of the cases 110 includes a controller (not shown) capable of control its entire operation so as to control and integrate interactions among the tag reader 112, the distance sensor 114, the network module 116, and the case prompt device 118. The controller may be a central processing unit (CPU) or other programmable devices for general purpose or special purpose such as a microprocessor, a microcontroller, a programmable controller, an application specific integrated circuit (ASIC), a programmable logic device (PLD) or other similar devices or a combination of the aforesaid devices.

The server 130 may be a server, such as an application server, a cloud server, that includes a database for recording related information of all the objects 120 in each of the cases 110. Moreover, the server 130 provides a platform which allows the mobile electronic device 140 to interact with the server 130.

The mobile electronic device 140 may be a mobile device having a display, input, and communication features such as a tabular computer, a laptop computer, a smart phone, a smart watch, and so forth. The mobile electronic device 140 may also be connected to the server 130 through wireless network connection.

Figure 2A:
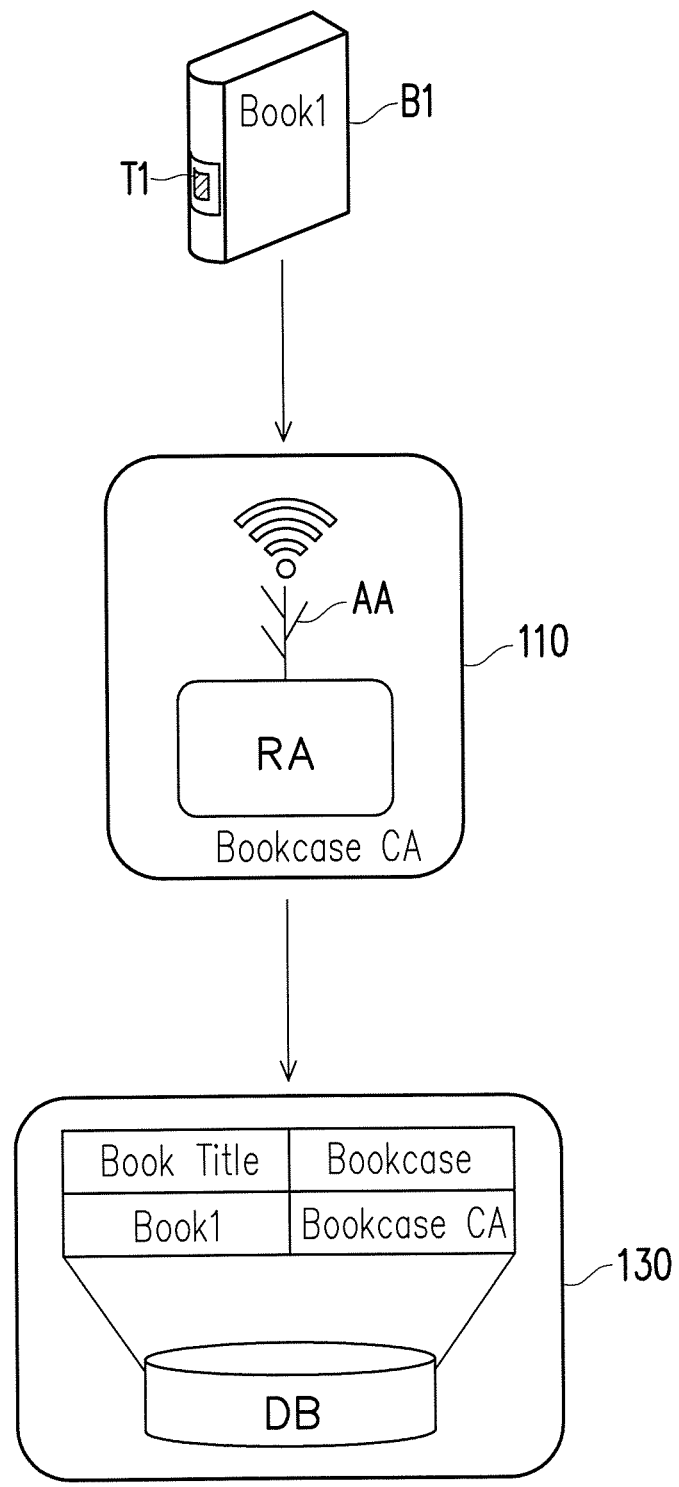
FIG. 2A illustrates a flowchart of an object location tracking pre-process method according to an embodiment of the disclosure.

FIG. 2A illustrates a flowchart of an object location tracking pre-process method according to an embodiment of the disclosure. The flow is adapted to the server 130 in the system 100 to manage all the objects 120 by using the database. In the present embodiment, each of the cases 110 is a bookcase, and the objects 120 are books. It should be noted that, only each of the cases 110 is configured a prompt device in the present embodiment.

Referring to FIG. 2A, an electronic identification tag T1 of a book B1 with a book title 'Book1' records related information of the book B1, where the related information at least includes information for identify the book B1 such as its book title or book serial number. When a bookcase CA receives a detected signal of the electronic identification tag T1 of the book B1 via an antenna AA of a tag reader RA, the tag reader RA would generate book information and position information of the book B1 according to the detected signal. For RFID technology, when a user places the book B1 in the bookcase CA, the antenna AA would detect the signal transmitted from the electronic identification tag T1 through radio waves. The tag reader RA may decode the detected signal to obtain, for example, the book title 'Book1' of the book B1 and set it as the book information. In the present embodiment, since the signal of the electronic identification tag T1 is received by the antenna AA of the bookcase CA, the tag reader RA would set the bookcase CA as the position information. Next, the bookcase CA would transmit the book information and the position information of the book B1 to the server 130, and the server 130 would store the received information in a database DB to complete the information management on the book B1.

Figure 2B:
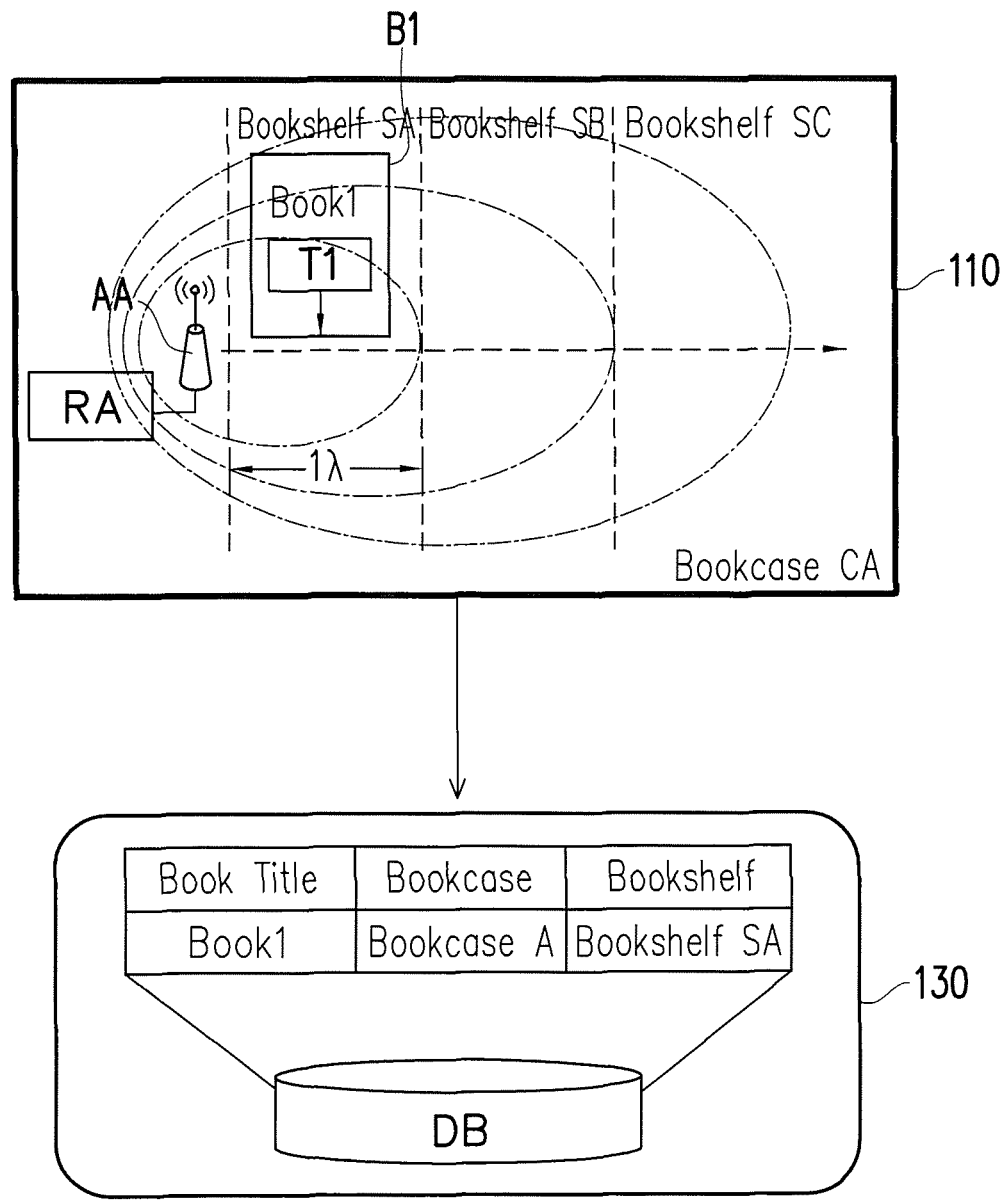
FIG. 2B illustrates a flowchart of an object location tracking pre-process method according to another embodiment of the disclosure.

In another embodiment, an object management on the bookcases 110 where each of which includes multiple shelves 1101 would be illustrated. FIG. 2B illustrates a flowchart of an object location tracking pre-process method according to another embodiment of the disclosure.

Referring to FIG. 2B, assume that the user in FIG. 2A places the book B1 on a bookshelf SA of the bookcase CA, the tag reader RA not only sets the book title 'Book1' of the book B1 as the book information and the bookcase CA as the position information, but also detects a distance between the book B1 and the antenna AA according to a strength and/or a wavelength of the detected signal to obtain a shelf position where the book B1 is located. For example, assume that the wavelength of the signal detected by the antenna AA is 1λ, the tag reader RA would determine that the book B1 is on the bookshelf SA which is extremely close to the antenna AA and would also set the bookshelf SA as the position information. Next, the bookcase CA would transmit the book information of the book B1 as well as the position information of the bookcase CA and the bookshelf SA to the server 130, and the server 130 would store the received information in a database DB to complete the information management on the book B1.

It should be noted that, when the tag reader RA either in FIG. 2A or in FIG. 2B periodically detects the electronic identification tag of each book in the bookcase CA via the antenna AA, and assume that the tag reader RA is not able to detect the signal of the book B1, it represents that the book B1 has left the bookcase CA. Meanwhile, the server 130 would remove or update the objection information and the position information associated with the book B1 in the database DB.

Figure 3:
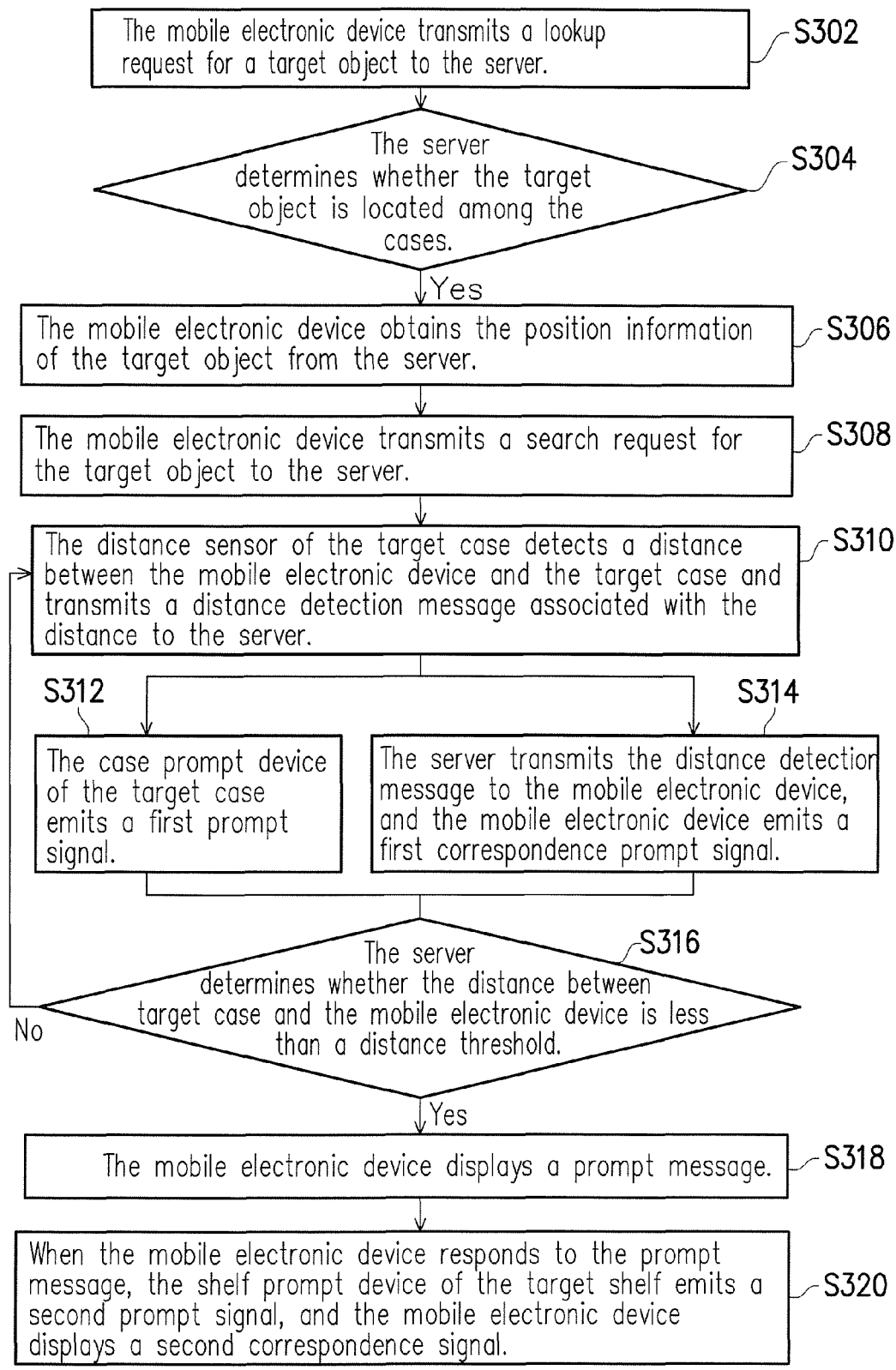
FIG. 3 illustrates a flowchart of an object location tracking method according to an embodiment of the disclosure.

FIG. 3 illustrates a flowchart of an object location tracking method according to an embodiment of the disclosure. The flow describes the interaction between the devices in the system 100 when the mobile electronic device 140 is searching for a particular object.

Referring to FIG. 3, the mobile electronic device 140 first transmits a lookup request for a target object to the server 130 (Step S302), and the server 130 determines whether the target object is located among the cases 110 in the system 100 (Step S304). To be specific, the mobile electronic device 140 may be connected to the platform provided by the server 130 to look up for the target object. The user of the mobile electronic device 140 may look up for the target object by entering a name or a serial number of the target object, and the server 130 may check the database whether the corresponding target object exists.

When the server 130 determines that the target object is located among the cases 110 in the system 100, it would display position information of the target object on the platform. The mobile electronic device 140 may then obtain the position information of the target object from the server 130 (step S306). The position information herein may be the case 110 and the shelf 1101 where the target object is located (referred to as "target case 110" and "target shelf 1101" hereafter). On the other hand, when the server 130 determines that the target object does not exist, it would, for example, display an error message to ask the user of the mobile electronic device 140 to re-enter or look up for another object.

Next, the mobile electronic device 140 transmits a search request for the target object to the server 130 (Step S308). When the server 130 receives the search request, it would transmit the search request to the target case 110. The distance sensor 114 of the target case 110 would detect a distance between the mobile electronic device 140 and the target case 110 and transmit a distance detection message associated with the distance to the server 130 (Step S310). The case prompt device 118 of the target case 110 would emit a first prompt signal (Step S312). Meanwhile, the server 130 would also transmit the distance detection message to the mobile electronic device 140, and the mobile electronic device 140 would emit a first correspondence prompt signal (Step S314). Herein, the first correspondence prompt signal corresponds to the first prompt signal. For example, assume that the first prompt signal is a red light, then the mobile electronic device 140 would display red texts or a red box on the display as the first correspondence prompt signal. Accordingly, the user of the mobile electronic device 140 may rapidly find out the target case 110 by reading the distance detection message and comparing the two signals.

Moreover, when the server 130 obtains the distance detection message, it would determine whether the distance between target case 110 and the mobile electronic device 140 is less than a distance threshold (Step S316). The distance threshold may be a distance such that the mobile electronic device 140 is located at the front of the target case 110 (e.g. 2 m). When the server 130 determines that the distance between the target case 110 and the mobile electronic device 140 is not less than the distance threshold, the flow returns to Step S310 so that the distance sensor 114 of the target case 110 continues detecting the distance between the mobile electronic device 140 and the target case 110.

On the other hand, when the server 130 determines that the distance between the target case 110 and the mobile electronic device 140 is less than the distance threshold, the mobile electronic device 140 would display a prompt message (Step S318) to ask the user of the mobile electronic device 140 whether to let the target case 110 further locate the target shelf 1101 on which the target object 120 is.

When the mobile electronic device 140 responds to the prompt message, the shelf prompt device 1101a of the target shelf 1101 would emit a second prompt signal, and the mobile electronic device 140 would display a second correspondence signal (Step S320). Herein, the second correspondence prompt signal corresponds to the second prompt signal. For example, assume that the second prompt signal is a green light, then the mobile electronic device 140 would display green texts or a green box on the display as the second correspondence prompt signal. Accordingly, the user of the mobile electronic device 140 may rapidly find out the target shelf 1101 where the target object 120 is located by comparing the two signals.

In an embodiment, the system 100 further includes another mobile electronic device. When such mobile electronic device is searching for another target object, a prompt signal corresponding to such mobile electronic device would be different from that corresponding to the mobile electronic device 140. Thus, the system 100 would allow multiple mobile electronic devices to search for different target objects at the same time.

In an embodiment, the first prompt signal and the second prompt signal may be a blinking light. In the present embodiment, the mobile electronic device 140 may display a light blinking control object and continuously detect any touch operation performed on the light blinking control object by the user. When the mobile electronic device 140 detects a first operation corresponding to the target case 110, a blinking frequency of the first prompt signal would be the same as a touch frequency of the first touch operation. For example, when the first touch operation is a continuous triple tap on the touch screen of the mobile electronic device 140 performed by the user, the first prompt signal would be a blinking light which blinks three times in a row. Similarly, when the mobile electronic device 140 detects a second touch operation corresponding to the target shelf 1101, a blinking frequency of the second prompt signal emitted by the shelf prompt device 1101a of the target shelf 1101 would be the same as a touch frequency of the second touch operation.

In another embodiment, each of the objects 120 may also correspond to an individual prompt device, where its configuration and interaction with the mobile electronic device 140 would be similar to those of the case prompt device 118 and the shelf prompt device 1101a and would not be repeated herein.

Figure 4A:
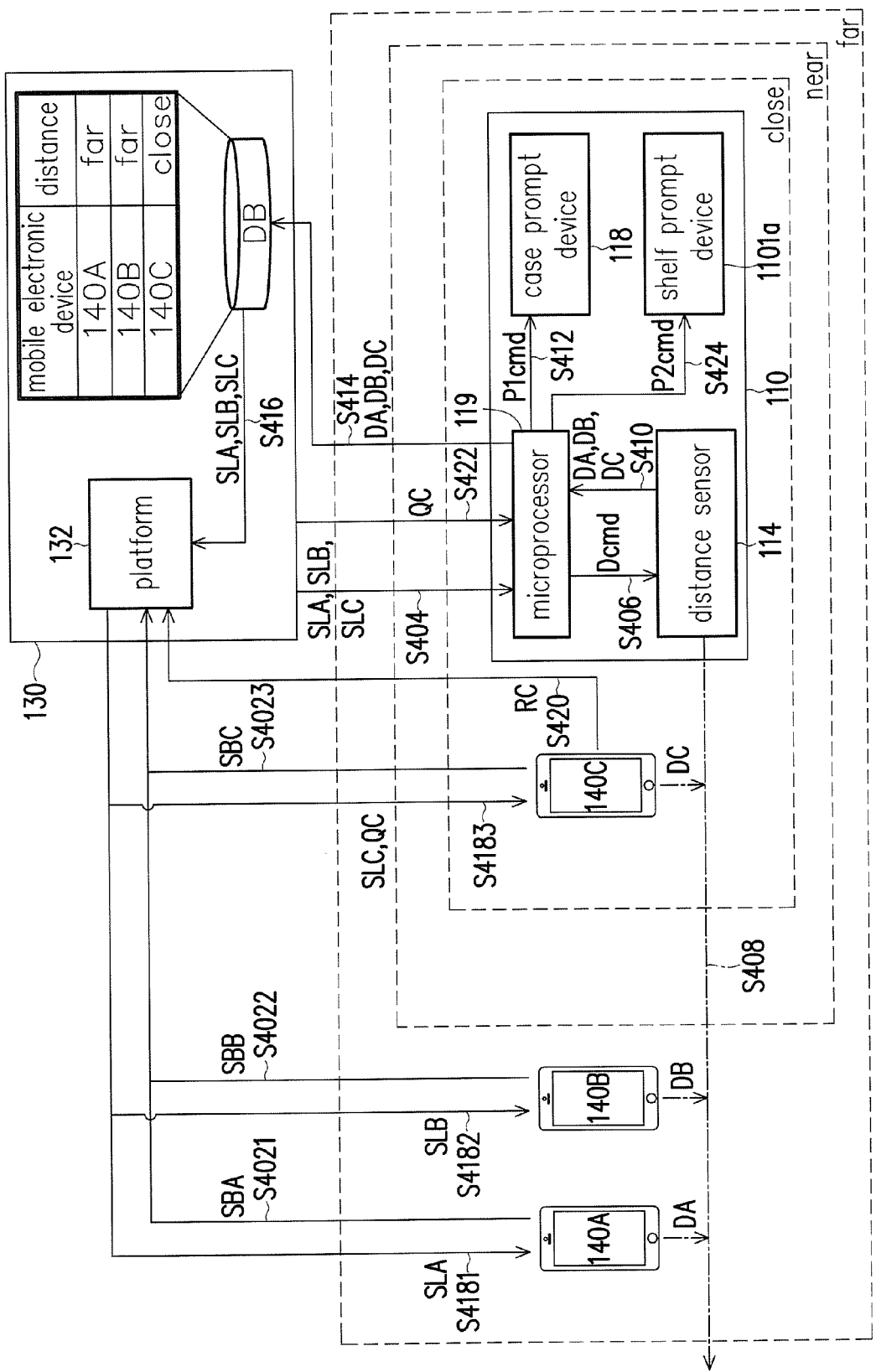
FIG. 4A illustrates a data flow diagram of an object location tracking method according to an embodiment of the disclosure.

FIG. 4A illustrates a data flow diagram of an object location tracking method according to an embodiment of the disclosure. In the present embodiment, while multiple mobile electronic devices 140A-140C are respectively searching for target objects in the same case 110, the data flow among the mobile electronic devices 140-140C, the server 130 and the case 110 would be provided as follows. In should be noted that, the target objects searched by the mobile electronic device 140A-140C are not limited to the same or different objects.

Referring to FIG. 4A, when the mobile electronic devices 140A-140C respectively obtains position information of the target objects from the server 130, they would respectively transmit lookup requests SBA-SBC to the platform 132 of the server 130 (Data Flow S4012-S4023).

After the server 130 receives the lookup requests SBA-SBC, it would transmit the lookup requests SBA-SBC to the case 110, and the microcontroller 119 of the case 110 would receive the lookup requests SBA-SBC via the network module (not shown) (Data Flow S404). It should be noted that, in other embodiments, if the mobile electronic devices 140A-140C are not searching for the target objects concurrently, the server 130 would transmit the lookup requests SBA-SBC to the case 110 at different time points.

Next, the microcontroller 119 would send a distance detection command Dcmd to the distance sensor 114 (Data Flow S406) to inform the distance sensor 114 to detect a distance between each of the mobile electronic device 140A-140C and the case 110. After the distance sensor 114 performs distance detection on the mobile electronic device 140A-140C, it would obtain three detected distance values DA-DC (Data Flow 5408) and report the detected distance values DA-DC to the microcontroller 119 (Data Flow S410).

Next, the microcontroller 119 would send a first prompt command P1cmd to the case prompt case 118 (Data Flow 5412) to inform the case prompt case 118 to emit a first prompt signal corresponding to each of the mobile electronic devices 140A-140C. In the present embodiment, the case prompt device 118 would in turn emit the first prompt signal corresponding to each of the mobile electronic devices 140A-140C. In another embodiment, the case prompt device 118 may further emit the first prompt signals with different frequencies adaptively based on the amounts of the detected distance values DA-DC.

On the other hand, the microcontroller 119 may also transmit the detected distance values DA-DC corresponding to the mobile electronic devices 140A-140C to the database DB of the server 130 via the network module (Data Flow S414). In the present embodiment, the database DB may divide all detected distance values into three levels: "far", "near", and "close". For example, in the present embodiment, the levels corresponding to the mobile electronic devices 140A-140C are respectively "far", "far", and "near". The database DB would inform the levels corresponding to the mobile electronic devices 140A-140C (referred to as distance detection message SLA-SLC) to the platform 132 (Data Flow S416), and the mobile electronic devices 140A-140C would obtain the distance detection message SLA-SLC through the platform 132 (Data Flow S4181-S4183). The mobile electronic devices 140A-40C would then emit first correspondence prompt signals corresponding to the first prompt signals.

Moreover, assume that the detected distance value DC corresponding to the mobile electronic device 140C is less than the distance threshold. The mobile electronic device 140C may also receive a prompt message QC through the platform 132 (Data Flow S4183) to ask the user of the mobile electronic device 140C whether to let the case 110 further locate the shelf where the target object is.

When the mobile electronic device 140C responds to the prompt message QC, it would transmit a search request RC to the platform 132 (Data Flow S420). After the server 130 receives the search request RC, it would transmit the search request RC to the case 110 (Data Flow S422). Next, the microcontroller 119 would send a second prompt command P2cmd to the shelf prompt device 1101a (Data Flow S424) to inform the shelf prompt device 1101a to emit a second prompt signal. Meanwhile, the mobile electronic device 140C would also display a second correspondence prompt signal corresponding to the second prompt signal so as to allow the user of the mobile electronic device 140C to intuitively know the shelf on which the target object is located.

Figure 4B:
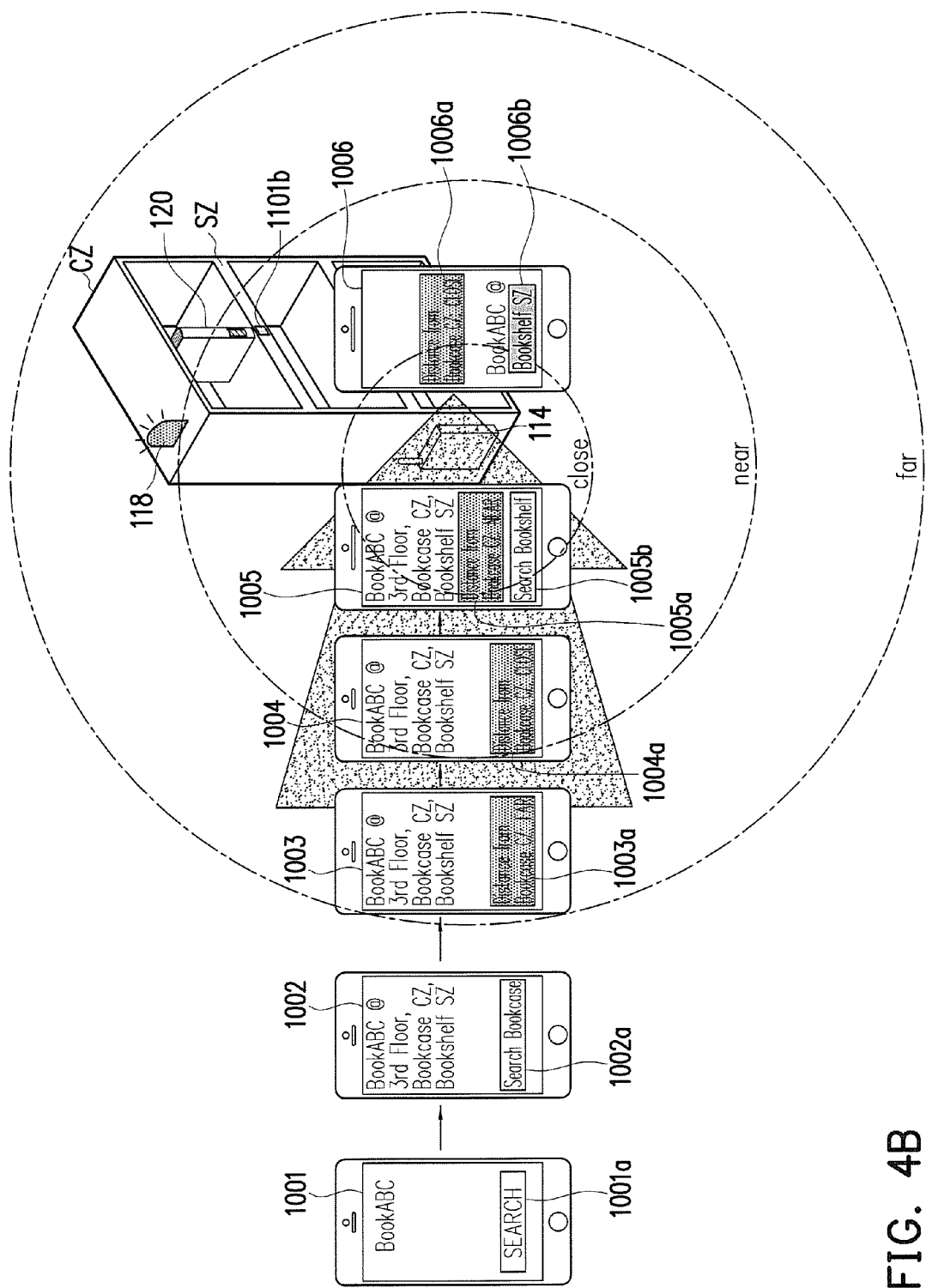
FIG. 4B illustrates a diagram of an abject location tracking scenario according to an embodiment of the disclosure.

FIG. 4B illustrates a diagram of an abject location tracking scenario according to an embodiment of the disclosure. In this scenario, the cases 110 would be bookcases, and objects 120 would be books.

Referring to FIG. 4B, a display frame 1001 of the mobile electronic device 140 would display a platform which is able to interact with the sever 130. When the user enters a book title ("BookABC") of a book and taps on a lookup object ("SEARCH") 1001a to look up for the book, a display frame 1002 of the mobile electronic device 140 would display position information of the book recorded in the sever 130 and a search bookcase object 1002a. When the user taps on the search bookcase object 1002a, the distance sensor 114 on a bookcase CZ placing the book would continuously detect a distance between the mobile electronic device 140 and itself, and the mobile electronic device 140 and the case prompt device 118 of the bookcase CZ would concurrently display two corresponding prompt signals. Assume that the prompt signal of the case prompt device 118 is a green light. When the mobile electronic device 140 is still far away from the distance sensor, a distance detection message 1003a displayed on a display frame 1003 of the mobile electronic device 140 would be "far", and the display frame 1003 would also display a signal corresponding to the green light such as green texts, a green box, a green light, and so forth. While the mobile electronic device 140 is becoming closer to the distance sensor 114 of the bookcase CZ, a distance detection message 1004a displayed on a display frame 1004 of the mobile electronic device 140 would be "near", and the display frame 1004 would also still display the signal corresponding to the green light.

When the distance between the mobile electronic device 140 and the distance sensor 114 of the bookcase CZ is less than the distance threshold, a distance detection message 1005a displayed on a display frame 1005 of the mobile electronic device 140 would be "close", and the display frame 1005 would further display a search bookshelf object 1005b. When the user taps on the search bookshelf object 1005b, a display frame 1006 of the mobile electronic device not only displays a same distance detection message 1006a as "close", but also concurrently displays a prompt signal 1006b corresponding to the shelf prompt device 1101a of the bookshelf SZ of the bookcase CZ so as to allow the user of the mobile electronic device 140 to intuitively know the shelf on which the book is located.

Figure 5:
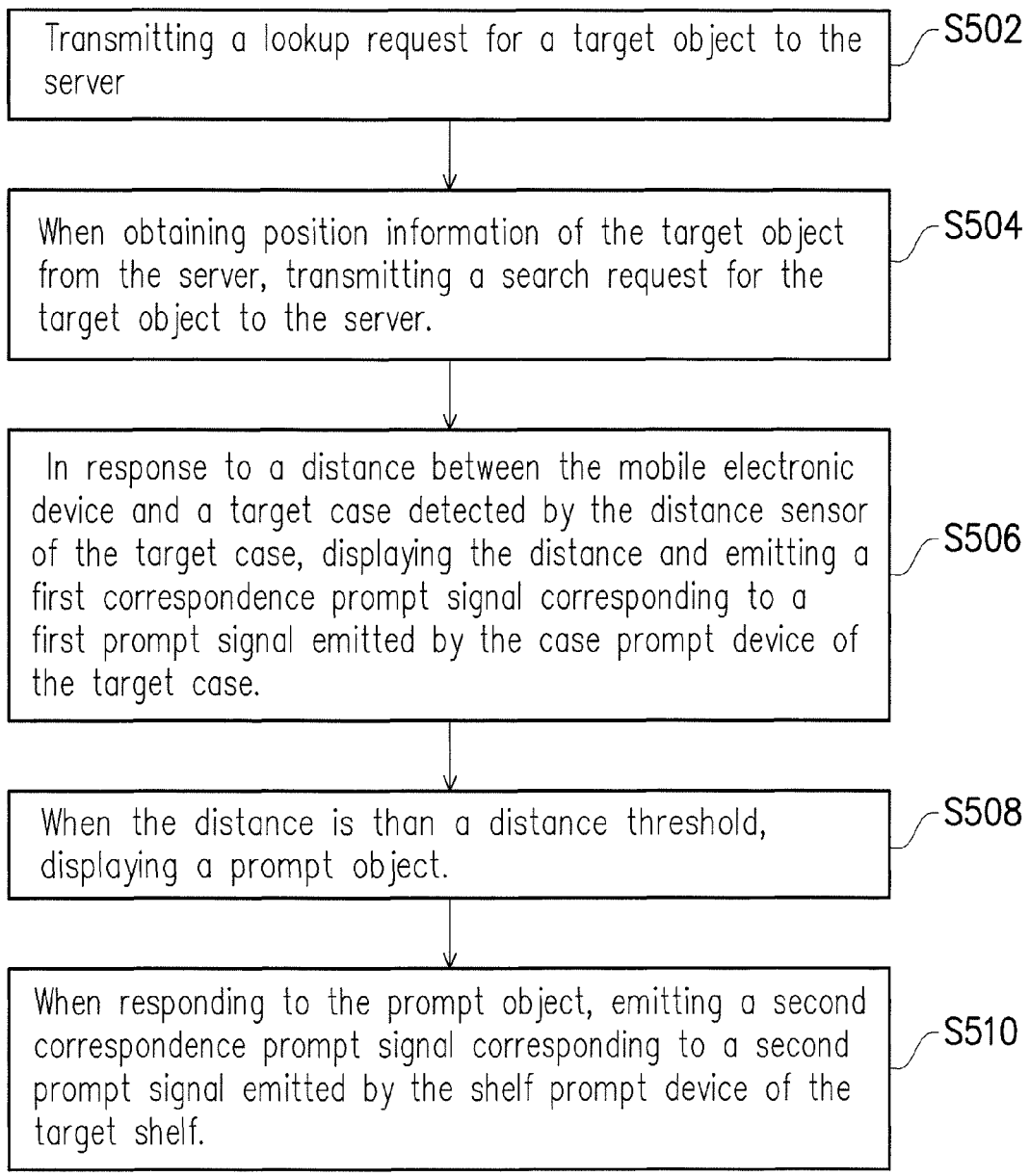
FIG. 5 illustrates a flowchart of an object location tracking method according to an embodiment of the disclosure.

FIG. 5 illustrates a flowchart of an object location tracking method according to an embodiment of the disclosure. The flow provides a description of the interaction among the mobile electronic device 140, the server 130, and the case 110 when the mobile electronic device 140 is searching for a particular object.

Referring to FIG. 5, the mobile electronic device 140 transmits a lookup request for a target object to the server 130 (Step S502). When the mobile electronic device 140 receives position information of the target object from the server 130, it would transmit a search request for the target object to the server 130 (Step S504). In response to a distance between the mobile electronic device 140 and the target case 110 detected by the distance sensor 114 of the target case 110, the mobile electronic device 140 displays the distance and emits a first correspondence prompt signal corresponding to a first prompt signal emitted by the case prompt device 118 (Step S506). When the server 130 determines that the distance is less than the distance threshold, the mobile electronic device 140 would display a prompt object (Step S508). When the mobile electronic device 140 responds to the prompt object, it would emit a second correspondence prompt signal corresponding to a second prompt signal emitted by the shelf prompt device 1101a (Step S510). The steps in FIG. 5 may refer to the related description in the previous embodiments and would not be repeated herein.

The disclosure also provides a non-transitory computer readable medium, which records computer program to execute the steps of the aforesaid object location tracking method. The computer program is composed of a plurality of program instructions (for example, an organization chart, establishing program instruction, a table approving program instruction, a setting program instruction, and a deployment program instruction, etc.), and these program instructions are loaded into the mobile electronic device 140 and executed by the same to accomplish various steps of the aforesaid object location tracking method.

In view of the foregoing, in the proposed method, system, and computer-readable recording medium, the server is able to track all objects in a system at any time through an electronic identification tags configured on each of the objects and a tag reader configured on each case. While the mobile electronic device is searching for a particular object, the mobile electronic device not only provides a distance between the particular object and itself in real time for the user, but also synchronizedly displays a signal corresponding to a position at which the particular is located so as to allow the user to rapidly locate the particular object. The disclosure may reduce search time on the objects and further precisely obtain statuses of the objects to attain effective management.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A system for object location tracking comprising:
   a plurality of objects, wherein each of the objects comprises an electronic identification tag;
   at least one case, configured to place the objects, wherein each of the at least one case comprises a tag reader having an antenna, a distance sensor, and a case prompt device;
   a mobile electronic device; and
   a server, configured to record object information and position information of each of the objects and establish connection with each of the at least one case and the mobile electronic device, wherein the position information of each of the objects comprises the case where the object is located, wherein
      when the server receives a lookup request for a target object from the mobile electronic device, the server determines whether the target object is located in any of the at least one case;
      when the server determines that the target object is located in a target case among the at least one case, the mobile electronic device obtains the position information of the target object from the server;
      when the server receives a search request for the target object from the mobile electronic device, the distance sensor of the target case detects a distance between the mobile electronic device and the target case and transmits a distance detection message associated with the distance to the server;
      the mobile electronic device displays a first correspondence prompt signal corresponding to a first prompt signal emitted by the case prompt device of the target case; and
      when the server determines that the distance is less than a distance threshold, the mobile electronic device displays a prompt object.

2. The system according to claim 1, wherein for each of the at least one case:
   when the case receives a detected signal of the electronic identification tag of any object among the objects via the antenna of the tag reader, the tag reader generates the object information and the position information of the any object according to the detected signal; and
   the case transmits the object information and the position information of the any object to the server.

3. The system according to claim 1, wherein when the server receives the distance detection message, the server further transmits the distance detection message to the mobile electronic device, and the mobile electronic device displays the distance detection message.

4. The system according to claim 1, wherein each of the at least one case further comprises a plurality of shelves, wherein each of the shelves comprises a shelf prompt device, wherein the position information of each of the objects further comprises the shelf where the object is located, and wherein when the mobile electronic device responds to the prompt object, the mobile electronic device displays a second correspondence prompt signal corresponding to a second prompt signal emitted by the shelf prompt device of a target shelf where the target object is located.

5. The system according to claim 4, wherein for each of the cases, when the case receives a detected signal of the electronic identification tag of any object among the objects via the antenna of the tag reader, the tag reader determines the shelf where the any object is located according to a strength and/or a wavelength of the detected signal.

6. The system according to claim 4, wherein the first prompt signal is a light with a first color, wherein the first correspondence prompt signal is a display object with the first color, wherein the second prompt signal is a light with a second color, and wherein the second correspondence prompt signal is a display object with the second color.

7. The system according to claim 4, wherein the first prompt signal and the second prompt signal are blinking lights, wherein when the mobile electronic device detects at least one first touch operation corresponding to the first prompt signal, a blinking frequency of the first prompt signal is the same as a touch frequency of the first touch operation, and wherein when the mobile electronic device detects at least one second touch operation corresponding to the second prompt signal, a blinking frequency of the second prompt signal is the same as a touch frequency of the second touch operation.

8. The system according to claim 1, wherein for each of the at least one case, when the case determines that any object among the objects leaves the case via the tag reader, the server removes the object information and the position information of the any object.

9. The system according to claim 1 further comprises another mobile electronic device, wherein
when the server receives a lookup request for another target object from the another mobile electronic device, the server determines whether the another target object is located at any of the at least one case,
when the server determines that the another target object is located at another target case among the at least one case, the another mobile electronic device obtains the position information of the another target object from the server;
when the server receives a search request for the another target object from the another mobile electronic device, the distance sensor of the another target case detects another distance between the another mobile electronic device and the another target case and transmits another distance detection message associated with the another distance to the server;
the another mobile electronic device displays another first correspondence prompt signal corresponding to another first prompt signal emitted by the case prompt device of the another target case; and
when the server determines that the another distance is less than the distance threshold, the another mobile electronic device displays another prompt object.

10. The system according to claim 9, wherein when the another mobile electronic device responds to the another prompt object, the another mobile electronic device displays another second correspondence prompt signal corresponding to another second prompt signal emitted by the shelf prompt device of the another target shelf where the another target object is located.

11. The system according to claim 1, wherein the electronic identification tag is a radio frequency identification (RFID) tag, and wherein the tag reader is a RFID reader.

12. A method for object location tracking, adapted for a mobile electronic device to search for a target object from at least one case having a plurality of objects, wherein each of the objects comprises an electronic identification tag, wherein each of the at least one case comprises a tag reader having an antenna, a distance sensor, and a case prompt device, wherein the mobile electronic device and each of the at least one case respectively establish connection with a server, wherein the server records object information and position information of each of the objects, and wherein the method comprises:
transmitting a lookup request for a target object to the server;
when obtaining the position information of the target object from the server, transmitting a search request for the target object to the server, wherein the target object is located in a target case among the at least one case;
in response to a distance between the mobile electronic device and the target case detected by a distance sensor of the target case, displaying a first correspondence prompt signal corresponding to a first prompt signal emitted by the case prompt device of the target case; and
in response to the distance determined by the server to be less than a distance threshold, displaying a prompt object.

13. The method according to claim 12, wherein in response to the distance between the mobile electronic device and the target case detected by the distance sensor of the target case, the method further comprises:
receiving a distance detection message associated with the distance from the server and displaying the distance detection message.

14. The method according to claim 12, wherein each of the at least one case further comprises a plurality of shelves, wherein each of the shelves comprises a shelf prompt device, wherein the position information of each of the objects further comprises the shelf where the object is located, and wherein the method further comprises:
responding to the prompt object; and
displaying a second correspondence prompt signal corresponding to a second prompt signal emitted by the shelf prompt device of a target shelf where the target object is located.

15. The method according to claim 14, wherein the first prompt signal is a light with a first color, wherein the first correspondence prompt signal is a display object with the first color, wherein the second prompt signal is a light with a second color, and wherein the second correspondence prompt signal is a display object with the second color.

16. The method according to claim 14, wherein the first prompt signal and the second prompt signal are blinking lights, and wherein the method further comprises:
in response to at least one touch operation corresponding to the first prompt signal being detected, a blinking frequency of the first prompt signal is the same as a touch frequency of the first touch operation; and
in response to at least one touch operation corresponding to the second prompt signal being detected, a blinking frequency of the second prompt signal is the same as a touch frequency of the second touch operation.

17. The method according to claim 12, wherein the electronic identification tag is a radio frequency identification (RFID) tag, and wherein the tag reader is a RFID reader.

18. A non-transitory computer readable recording medium, storing a first computer program to be loaded into a mobile electronic device to perform steps of:
transmitting a lookup request for a target object to a server, wherein the target object is searched from at least one case having a plurality of objects wherein each of the objects comprises an electronic identification tag, wherein each of the at least one case comprises a tag reader having an antenna, a distance sensor, and a case prompt device, wherein the mobile electronic device and each of the at least one case respectively establish connection with the server, wherein the server records object information and position information of each of the objects;

when obtaining the position information of the target object from the server, transmitting a search request for the target object to the server, wherein the target object is located in a target case among the at least one case;

in response to a distance between the mobile electronic device and the target case detected by a distance sensor of the target case, displaying a first correspondence prompt signal corresponding to a first prompt signal emitted by the case prompt device of the target case; and in response to the distance determined by the server to be less than a distance threshold, displaying a prompt object.

19. The non-transitory computer readable recording medium according to claim 18, further storing a second computer program to be loaded into the mobile electronic device to perform steps of:

responding to the prompt object, wherein each of the at least one case further comprises a plurality of shelves, wherein each of the shelves comprises a shelf prompt device, wherein the position information of each of the objects further comprises the shelf where the object is located; and displaying a second correspondence prompt signal corresponding to a second prompt signal emitted by the shelf prompt device of a target shelf where the target object is located.

* * * * *